G. C. HOSKIN.
TIRE PROTECTOR.
APPLICATION FILED OCT. 14, 1907.
911,984.
Patented Feb. 9, 1909.
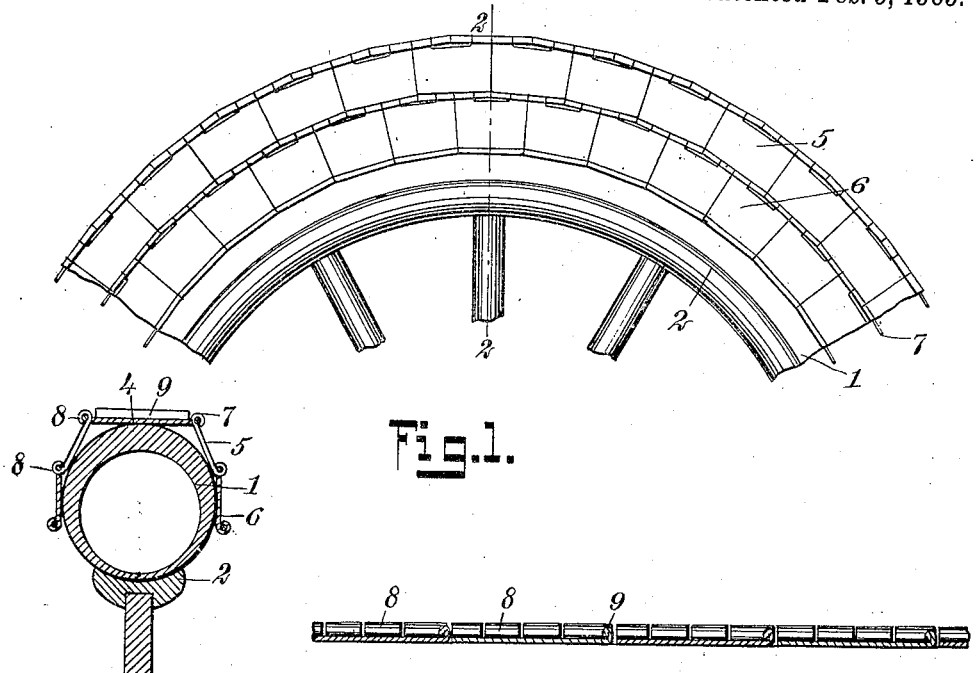
Fig.1.
Fig.2.
Fig.3.
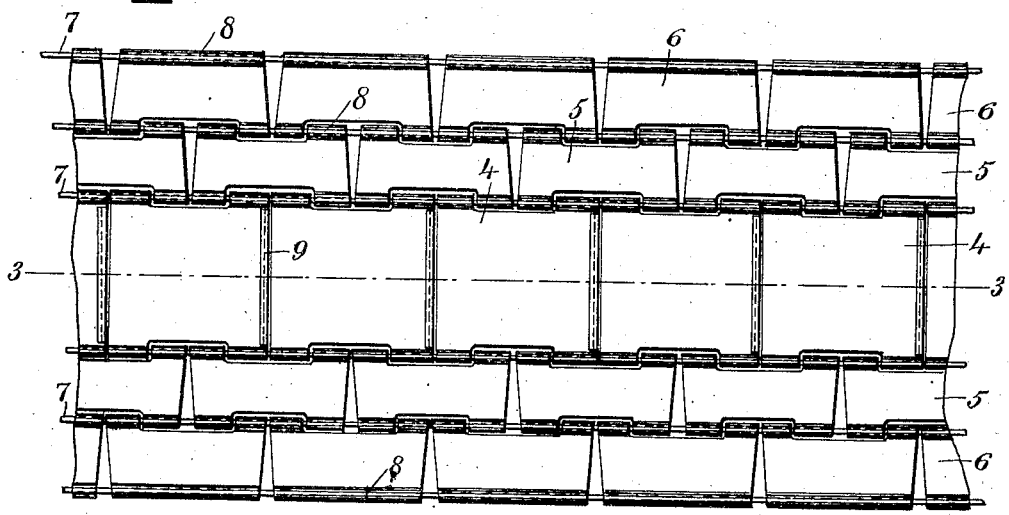
Fig.4.
WITNESSES
Chas. A. Clark
INVENTOR
George C. Hoskin
BY Munn & Co.
ATTORNEYS

UNITED STATES PATENT OFFICE.

GEORGE CLARENCE HOSKIN, OF LE MARS, IOWA.

TIRE-PROTECTOR.

No. 911,984.

Specification of Letters Patent.

Patented Feb. 9, 1909.

Application filed October 14, 1907. Serial No. 397,306.

*To all whom it may concern:*

Be it known that I, GEORGE CLARENCE HOSKIN, a citizen of the United States, and a resident of Le Mars, in the county of Plymouth and State of Iowa, have invented a new and Improved Tire-Protector, of which the following is a full, clear, and exact description.

This invention relates to protectors for automobile tires, bicycle tires, and the like.

An object of the invention is to provide a flexible tire protector constructed to obviate any danger of the tires becoming punctured by sharp stones, nails, glass, or the like.

A further object of the invention is to provide a tire protector as described, which is so constructed that it eliminates all danger of skidding on slippery roads or pavements, and which increases the tractive efficiency of the driving wheels.

The invention consists in the construction and combination of parts to be more particularly described hereinafter and particularly set forth in the claims.

Reference is to be had to the accompanying drawings forming a part of this specification, in which similar characters of reference indicate corresponding parts in all the figures, in which—

Figure 1 is a side elevation showing the device as applied to a tire; Fig. 2 is a cross section on the line 2—2 of Fig. 1; Fig. 3 is a longitudinal section on the line 3—3 of Fig. 4; and Fig. 4 is a plan view showing part of the device extended and arranged in one plane.

Before proceeding to a more detailed description of my invention, it should be understood that I provide a protector constructed of metal plates, flexibly joined together, which covers substantially the entire surface of the tire and not only protects the same from puncture, but practically obviates any danger of the car skidding on slippery pavements, by presenting both lateral and transverse ribs to the road bed. Furthermore, the transverse ribs facilitate running on soft surfaces and obviate the necessity of using chains or similar devices. The parts when worn or broken can be easily replaced without removing the protector from the tire.

Referring more particularly to the drawings, 1 is a rubber vehicle tire of any common or preferred type and is suitably mounted upon the rim 2, of a wheel.

The tire protector can be fashioned from any suitable material, such as sheet metal, or the like, and comprises a series of tread plates 4, a series of side plates 5 and a further series of edge plates, 6. Pivotally connecting these plates are members 7, fashioned from wire, or the like, and either extending in unbroken continuity around the protector or being divided at intervals to permit of greater resiliency in the device. Sleeves 8, formed by the edges of the plates being turned upon themselves, receive the members 7 and constitute hinge joints therewith. These sleeves are laterally disposed and present registering openings for the members 7.

The tread plates 4 are provided with outwardly disposed ribs or flanges 9, each plate having an edge suitably bent for the purpose. The transverse ribs 9 increase the tractive efficiency of the driving wheels, especially on soft or slippery surfaces. Furthermore, the sleeves of the tread member and those of the side members adjacent thereto, constitute corrugations, which prevent lateral skidding on slippery surfaces.

On protectors constructed for the front tires of vehicles, flanges 9 are not necessary and can be eliminated.

To attach my device to a tire it is only necessary to adjust the protector to the former when deflated, the inflation of the tire holding it in rigid position thereupon. The plates can be replaced when broken or worn, without removing the protector from the tire. The tread plates are substantially rectangular in form, while the lateral plates are tapered outwardly to permit the bending of the sides of the protector when it is in position on a tire.

It should be understood that I do not limit myself to the particular construction herein disclosed, as it may be altered within reasonable limits without departing from the spirit of the invention.

Having thus described my invention, I claim as new and desire to secure by Letters Patent:

1. A device of the class described, comprising a series of alined tread plates, having their side edges provided with spaced sleeves, and having at one end a transverse rib, a series of alined side plates on each side of the tread plates, said side plates having their side edges provided with spaced sleeves, one sleeve of each of two adjacent side plates being received between the sleeves of one tread plate, and alined therewith, a series of edge plates provided on their inner edge with spaced sleeves, one sleeve of each of two adjacent edge plates being received between the sleeves of one side plate, and alined therewith, wires traversing the alined sleeves, the free edge of the edge plates being provided with a sleeve, and a wire traversing the alined sleeves, the adjacent ends of the side plates and the edge plates being beveled for the purpose set forth.

2. A device of the class described comprising a series of alined tread plates, having their side edges provided with spaced sleeves, a series of alined side plates on each side of the tread plates, said side plates having their side edges provided with spaced sleeves, one sleeve of each of two adjacent side plates being received between the sleeves of one tread plate, and alined therewith, a series of edge plates, provided on their inner edge with spaced sleeves, one sleeve of each of two adjacent edge plates being received between the sleeves of one side plate, and alined therewith, wires traversing the alined sleeves, the free edge of the edge plates being provided with a sleeve, and a wire traversing the alined sleeves, the adjacent ends of the side plates, and edge plates being beveled for the purpose set forth.

In testimony whereof I have signed my name to this specification in the presence of two subscribing witnesses.

GEORGE CLARENCE HOSKIN.

Witnesses:
  J. T. DABB,
  CLYDE ROBY.